Oct. 3, 1933.  R. RODERWALD  1,928,869

PROCESS FOR MANUFACTURING V-TYPE BELTS

Filed Jan. 11, 1929

Inventor:
RUDOLF RODERWALD,
Attorneys

Patented Oct. 3, 1933

1,928,869

UNITED STATES PATENT OFFICE 1,928,869

PROCESS FOR MANUFACTURING V-TYPE BELTS

Rudolf Roderwald, Berlin, Germany, assignor to The Dayton Roderwald Company, Dayton, Ohio, a corporation of Ohio Application January 11, 1929, Serial No. 331,889, and in Germany June 4, 1928

6 Claims. (Cl. 154—4)

This invention relates to a new process of manufacturing belts, and particularly a drive belt of the general type shown in my pending application Serial No. 156,629, filed December 22, 1926, now Patent 1,702,896 issued Feb. 19, 1929, and wherein the belt is provided on one side thereof with spaced projections in the form of cleats, ribs or teeth.

It is the general object and purpose of my present invention to provide a process whereby the manufacture of belts of this type will be greatly simplified with an appreciable decrease in time and labor costs, and the practical elimination of waste of materials.

To the above end, I propose to utilize a mold form preferably in the nature of a toothed drum upon which the parts or laminations of the belt structure are applied and by means of which, such structure may be subjected to vulcanization in a suitable type of furnace to produce an endless or continuous belt. The belts so formed or made, may be of any desired width and subsequently cut into strips or sections to provide a plurality of belts of predetermined widths.

With the above and other objects in view, the invention consists in the improved process of manufacturing belts and in the several steps thereof, as will be hereinafter more fully described, illustrated in the accompanying drawing and subsequently incorporated in the subjoined claims.

In the drawing, wherein I have disclosed several practical ways in which the present invention may be carried out, and in which similar reference characters designate corresponding parts throughout the several views,—

Figure 1:
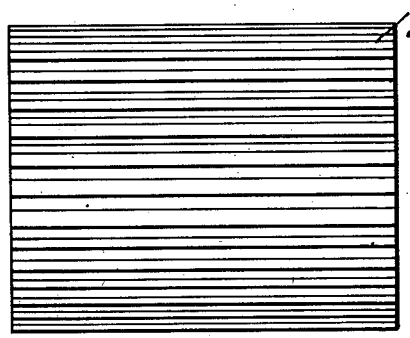
Figure 1 is an elevation of one embodiment of the drum shaped mold used in practicing my new process.
Figure 2:
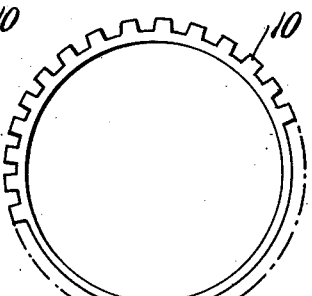
Fig. 2 is an end elevation thereof.

While various forms of molds for receiving the fabricated belt forming materials for the purpose of vulcanizing the same together might be employed, I preferably use a mold of cylindrical drum shaped form. This mold may be of the particular type indicated at 10 in Figs. 1 and 2 of the drawing having equi-distantly spaced parallel longitudinally extending ribs or teeth formed on its outer cylindrical surface. In the process of applying the belt material to the toothed surface of this drum shaped mold, it may be advantageous to impart a rotary movement to the mold, the fabricated belt material including an inner layer or lamination which extends closely over the toothed surface of the mold drum and which encloses and completely covers the parts forming the teeth, ribs or cleats of the belt, as will be more clearly seen from the following description.

After the belt material has been applied to the mold drum, the latter is preferably enclosed within a steel cylinder or jacket and the whole then inserted into a suitable type of vulcanizing furnace.

Figure 3:
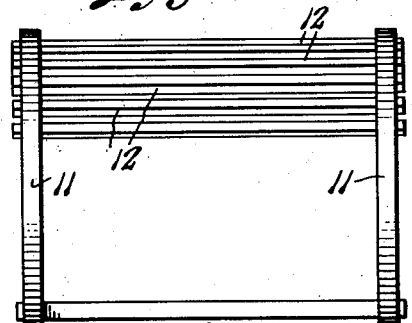
Fig. 3 is a side elevation of a mold drum of somewhat different form.
Figure 4:
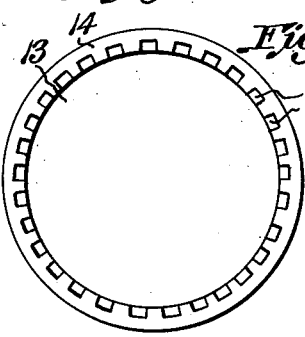
Fig. 4 is an end elevation illustrating a slight modification of the structure shown in Fig. 3.

In the embodiment of the mold drum shown in Fig. 3 of the drawing, instead of integrally forming the teeth on the outer surface of the drum wall, parallel removable bars 12 have their ends detachably engaged in suitable apertures provided in the discs 11 which are fixed to the opposite ends of the drum. In the alternative construction shown in Fig. 4 of the drawing, internally toothed rings 14 are engaged over the ends of the cylindrical drum 13, and the removable bars have their ends inserted into the spaces or recesses 15 between the teeth of these rings.

Figure 6:
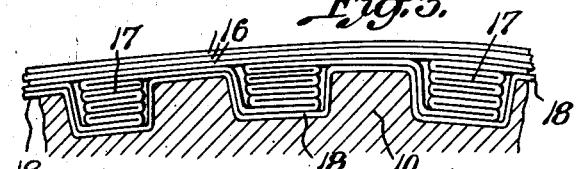
Figs. 6, 7, 8, 9 and 10 illustrate a number of different ways of applying the laminations of fabricated belt material to the toothed mold drum prior to vulcanization.

In applying the belt forming material to the mold drum, as shown in Fig. 6 of the drawing, I may first arrange a rubber impregnated fabric strip 18 over the toothed surface of the drum, said strip being in close contact with the faces of the teeth and the surfaces therebetween. A similar strip or lamination of impregnated fabric is then superimposed upon the strip 18 and has the folded parts 17 extending into the spaces between the drum teeth. Finally, a plurality of additional laminations 16 of such rubber impregnated fabric is wound upon the previously applied layers or laminations.

Figure 7:
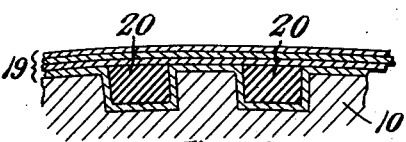

As shown in Fig. 7 of the drawing, after first applying the inner strip of material to the toothed surface of the drum, the spaces between the teeth may be filled with bars of rubber indicated at 20, the strip 19 being then wound a number of times to provide a plurality of outer laminations overlying the bars 20. It will of course, also be understood that in the arrangement shown in Fig. 6, the laminations 16, 17 and 18 constitute parts of one continuous strip of material.

Figure 8:
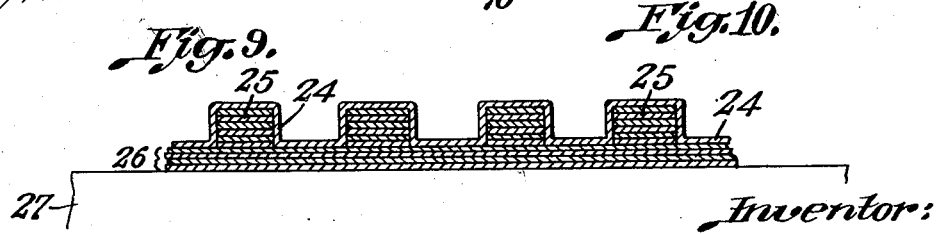

In Fig. 8 of the drawing, I have shown another alternative procedure, in which a plurality of laminations of the rubber impregnated material shown at 26 are first laid upon the surface of a table 27, and the spaced ribs, cleats or teeth each compose a plurality of relatively narrow strips as indicated at 25 and then superimposed upon the layers 26. An upper or outer layer or lamination 24 is then applied over the laminations 26 and the surfaces of the spaced cleats or teeth 25. This assembly is then reversed and applied to the toothed surface of the mold.

Figure 9:
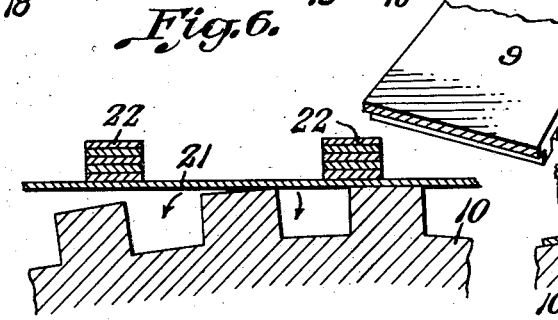
Figures 5, 10:
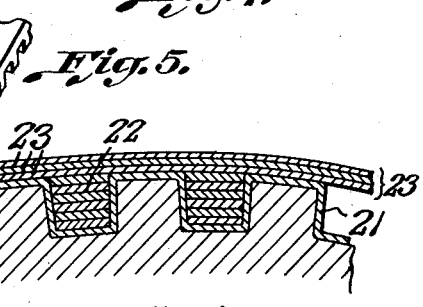
Fig. 5 is a fragmentary perspective view of a part of a vulcanized belt as made in accordance with the present process.

In accordance with the method or process as illustrated in Figs. 9 and 10 of the drawing, the layer or lamination 21 may first be laid upon the table and the spaced laminated cleats, ribs or teeth 22 then positioned on the layer 21. The assembly is then arranged in overlying relation to the toothed drum 10 and the ribs or cleats 22 successively pressed into the spaces between the teeth of the drum so that the parts of the layer 21 intervening between the cleats 22 will be closely engaged with the angular surfaces of the teeth of the drum.

After the belt material has been assembled on the toothed mold drum in accordance with any one of the methods above suggested, the drum is then enclosed within a suitable jacket and the whole inserted into the chamber of the vulcanizing furnace so that the parts of the belt structure become inseparably vulcanized together to produce the belt of the construction illustrated in Fig. 5 of the drawing. After the mold is removed from the furnace and the vulcanized belt structure detached therefrom, or before such detachment, the belt structure may be cut along spaced parallel lines to divide the same into a plurality of endless belts of desired widths. Also, if desired, each of these endless belts may be cut transversely to provide a belt of a desired length, and the ends thereof then connected together by means of a suitable fastener.

From the foregoing description considered in connection with the accompanying drawing, it will be seen that by means of my new process, manufacturing costs, waste of materials, and labor incident to the manufacture of such drive belts may be reduced to a minimum. I have herein specifically referred to several different ways of assembling the belt materials upon the toothed surface of the mold drum, but no unnecessary limitations are to be implied therefrom, since it is possible that other equivalent methods of applying the several laminations of rubber impregnated fabric to the mold drum might be devised. Accordingly, it is to be understood that I reserve the privilege in practice, of resorting to all such legitimate changes in carrying out the essential features of my present disclosure, as may be fairly considered within the spirit and scope of the invention as claimed.

I claim:

1. The process of manufacturing drive belts which consists in first superimposing a fabricated rubber impregnated fabric upon the toothed surface and between the teeth of a mold with said fabric substantially filling the spaces between the mold teeth, then winding a plurality of laminations of the rubber impregnated fabric around the toothed mold, then subjecting the applied laminations to a vulcanizing heat, and finally removing the vulcanized belt structure from the mold.

2. The process of manufacturing drive belts which consists in forming a sheet of rubber impregnated fabric with spaced corrugations therein projecting from one side of the plane of said sheet, and confining within the channels of said corrugations to substantially fill the same, strips of vulcanizable material to rigidly sustain the walls of the corrugations and form teeth or cleats on one side of the belt, then superimposing over the open sides of the corrugations and the material therein a plurality of laminations of rubber impregnated fabric, and then subjecting the whole assembly to a vulcanizing heat.

3. The process of manufacturing drive belts which consists in superimposing upon the toothed surfaces of the mold, a layer of rubber impregnated fabric, then arranging upon said layer and between the teeth of the mold superimposed strips of vulcanizable material, then applying a fabricated vulcanizable material in superimposed contact upon said assembled strips and the spaced parts of said first named layer, then subjecting the assembled materials upon said mold to a vulcanizing heat, and finally removing the vulcanized belt structure from the mold.

4. The process of manufacturing drive belts which consists in forming of continuous strips a belt structure having teeth or projections on one side thereof from fabricated vulcanizable materials and positioning the toothed belt structure in contact with the toothed surface of a mold, then subjecting the belt structure on said mold to a vulcanizing heat, and finally removing the vulcanized belt structure from the mold.

5. The process of manufacturing drive belts which consists in superimposing upon the toothed surface of a cylindrical mold, strips of vulcanizable belt forming materials circumscribing the mold teeth and folded into the spaces therebetween, then subjecting the assembled materials on said mold to a vulcanizing heat, and finally removing the vulcanized belt structure from the mold.

6. The process of manufacturing drive belts which consists in assembling upon a cylindrical toothed mold, vulcanizable belt forming materials folded between the teeth and wound around the teeth to produce a belt structure of indefinite width, then vulcanizing the belt forming materials together, and then cutting the vulcanized belt structure to form a plurality of belts of the required widths.

RUDOLF RODERWALD.